United States Patent Office 3,115,522
Patented Dec. 24, 1963

3,115,522
PRODUCTION OF ACRYLIC ACID BY THE DEALKOXYLATION OF BETA-ALKOXY PROPIONIC ACID
Herman J. Baumgartner, Danville, Philip Pezzaglia, El Cerrito, and George T. Williamson, Lafayette, Calif., assignors to Shell Oil Company, New York, N.Y., a corporation of Delaware
No Drawing. Filed July 31, 1961, Ser. No. 127,877
7 Claims. (Cl. 260—526)

This invention relates to the production of alpha,beta-olefinically unsaturated monocarboxylic acids by liquid phase cleavage of the corresponding beta-ether substituted carboxylic acids. The invention relates more particularly to an improved process for the production of acrylic acid by liquid phase cleavage of beta-alkoxypropionic acid.

It has been disclosed to subject beta-alkoxycarboxylic acids to conditions resulting in the separating off of the alkoxy group with the formation of reaction products comprising compounds containing a double bond. Heretofore the reaction was generally executed in the presence of a strong acid, particularly strong mineral acids such as, for example, sulfuric acid, phosphoric acid, etc. Under these highly acidic conditions formation of an unsaturated product is generally unavoidably accompanied by simultaneous production of substantial quantities of undesired material including high boiling by-products of complex character. These by-products not only represent a loss but present problems of operational procedure in the reaction system as well as in the recovery phase of the process. The heavy by-products adversely affect the yield of the desired product and result in fouling of equipment. The corrosive nature of the reaction mixture and product streams, as a consequence of the use of the highly acidic catalysts, brings about additional difficulties detrimental to efficient practical utilization of the process. A further serious drawback to the use of the acidic catalysts is the fact that the unsaturated cleavage product obtained in predominant amount in their presence is generally not a carboxylic acid but a derivative thereof. The reaction mixture will often comprise predominant amounts of specific esters and beta-ether substituted derivatives thereof.

It is therefore an object of the present invention to provide an improved process enabling the more efficient production of alpha,beta-olefinically unsaturated monocarboxylic acids by liquid phase cleavage of corresponding beta-ether substituted carboxylic acids in the absence of strong acid catalysts.

Another object of the invention is the provision of an improved process enabling the more efficient, liquid phase, catalytic cleavage of beta-ether substituted carboxylic acids to reaction products consisting predominantly of alpha, beta-olefinically unsaturated aliphatic monocarboxylic acids and aliphatic saturated alcohols.

Another object of the invention is the provision of an improved process enabling the more efficient production of acrylic acid by liquid phase cleavage of a beta-hydrocarbyloxypropionic acid.

A more specific object of the invention is the provision of an improved process enabling the more efficient cleavage of beta-alkoxypropionic acid, in a non-corrosive, liquid phase reaction medium, to reaction products consisting predominantly of acrylic acid and an alcohol.

In accordance with the invention alpha,beta-olefinically unsaturated monocarboxylic acids are produced by heating a beta-ether substituted carboxylic acid in liquid phase in the presence of a catalyst consisting essentially of an alkali metal salt and/or an alkaline earth metal salt of a beta-hydrocarbyloxycarboxylic acid. In a preferred embodiment of the invention the catalyst consists essentially of an alkali metal of the beta-ether substituted carboxylic acid being converted in the process.

Beta-ether substituted carboxylic acids converted to reaction products comprising olefinically unsaturated monocarboxylic acids in accordance with the invention comprise broadly the beta-hydrocarbyloxy-aliphatic monocarboxylic acids. Suitable members of this group include those wherein the hydrocarbyl group is alkyloxy or aralkyloxy and contains from one to about seventeen carbon atoms, and the aliphatic mono-carboxylic acid group contains from three to about twenty carbon atoms. The invention is applied with advantage to the cleavage of beta-aliphaticoxypropionic acids having from four to twenty carbon atoms to the molecule to reaction products comprising acrylic acid and an aliphatic alcohol corresponding to the aliphaticoxy group of the charge. It is applied with particular advantage to dealkoxylation of beta-alkoxypropionic acids wherein the beta-alkoxy group contains from one to about ten carbon atoms. Of this group, those wherein the alkoxy group is a lower alkyl group, preferably containing from one to about six carbon atoms, constitute a particularly preferred charge material. Representative examples of this particularly preferred group are: beta-methoxypropionic acid, beta-ethoxypropionic acid, beta-propoxy-propionic acid, beta-butoxypropionic acid, beta-pentoxypropionic acid, beta-hexoxypropionic acid, etc.; comprised are those wherein the alkoxy group is of branched or cyclic structure. Mixtures of two or more of the suitable beta-hydrocarbyloxycarboxylic acids may be used as charge to the process.

The beta-ether substituted carboxylic acid charge to the process need not necessarily be pure. A particularly suitable charge material comprises the beta-alkoxypropionic acids obtained by the oxidation, with molecular oxygen, of beta-alkoxypropionaldehydes; the beta-alkoxypropionaldehydes being readily obtained by reaction of the corresponding alpha,beta-unsaturated aldehydes with an alkanol. A specific example of such suitable charge to the process of the invention is, for example, the beta-ethoxypropionic acid obtained by the sequential steps of reacting acrolein with ethyl alcohol to obtain the beta-ethoxypropionaldehyde, for example, as described and claimed in copending application Serial Number 777,614, filed December 2, 1958, which issued as U.S. Patent 2,967,889, and the oxidation, in liquid phase, with molecular oxygen, of the beta-ethoxypropionaldehyde to the corresponding beta-ethoxypropionic acid. The crude beta-ether substituted carboxylic acid so obtained may be charged directly to the process of the present invention, or it may be subjected to suitable pretreating steps comprising one or more such steps as, for example, distillation, fractional distillation, extractive distillation, adsorption, solvent extraction, and the like.

As catalysts there are employed in the process of the invention at least one member of the group consisting of the alkali metal and alkaline earth metal salts of a beta-hydrocarbyloxycarboxylic acid. Examples of such suitable catalysts are the alkali metal salts and alkaline earth metal salts of beta-methoxypropionic acid, beta-ethoxypropionic acid, beta-ethoxyhydrocinnamic acid, beta-propoxy-alpha,alpha-dimethylpropionic acid, beta-isopropoxyisovaleric acid, beta-butoxybutyric acid, beta-methoxycaproic acid, beta-ethoxyadipic acid, beta-ethoxy-n-butylmalonic acid, meta-propoxypimelic acid, beta-methoxyvaleric acid, beta-butoxyglutaric acid, beta-methoxyazelaic acid and like monocarboxylic and dicarboxylic aliphatic acids. While the suitable salts comprise those of polycarboxylic acids, those of the monocarboxylic acids are preferred. It is preferred that the salts contain not more than about twenty carbon atoms. The suitable salts comprise those wherein the metal is, for example, Na, K, Li, Ca or Ba. Of these salts the alkali metal salts are preferred. Particularly preferred are the members of this class consisting of the salts of the beta-alkoxy aliphatic carboxylic acids. Particularly effective catalysts comprised in this preferred group are those wherein the alkoxy group contains no more than about six carbon atoms to the molecule.

In a preferred embodiment of the invention the catalyst employed is an alkali metal salt, or an alkaline earth metal salt, of the beta-ether substituted carboxylic acid which is charged to the cleavage reaction. Of the suitable alkali metal salts, the sodium salts are somewhat preferred. Thus, when converting beta-alkoxy propionic acid a preferred catalyst is the sodium salt of the beta-alkoxypropionic acid charged. For example, when converting beta-ethoxypropionic acid a preferred catalyst is sodium beta-ethoxypropionate.

The catalyst may be introduced into the system as such or it may be formed in situ. Thus, a suitable alkali metal or alkaline earth metal, or compound thereof, which is capable of reacting with the beta-ether substituted carboxylic acid charge under the conditions prevailing in the reaction zone may be introduced into the system to thereby form the alkali metal or alkaline earth metal salt of the beta-ether substituted carboxylic acid in the reaction zone. Examples of suitable compounds capable of forming the desired catalysts in situ comprise the oxides, hydroxides, alkoxides, carbonates, etc. of the alkali metal and alkaline earth metals, as well as other compounds thereof, such as, for example, tetra sodium borate, capable of forming the suitable salts in situ.

The catalyst, i.e., the alkali metal salt or alkaline earth metal salt of a beta-ether substituted monocarboxylic acid, or the alkali metal or alkaline earth metal compound capable of forming it by reaction with the charge, may be introduced as such, as a solution in a suitable solvent, or as a suspension in a suitable medium, into the reaction zone at one or more points thereof. Such catalysts, or precursors thereof, may be added in part or in entirety to the feed passing into the reaction zone and they may be added during the course of the process.

The amount of catalyst generally employed may vary considerably within the scope of the invention depending upon the specific material being converted and the conditions, such as temperature, being employed. The catalyst is generally effective in catalytic amounts. It is effective in amounts ranging, for example, from as little as about 0.1% by weight, based on the material being converted. It is usually preferred to employ the catalyst in somewhat larger relative amounts to thereby obtain appreciably faster reaction rates. The maximum catalyst concentration generally employed is limited by its solubility in the reaction mixture. The amount employed is preferably maintained below that which will result in any substantial settling out of catalyst as a separate phase within the reaction zone. A catalyst concentration in the range of, for example, from 0.1 to about 25% by weight of the reaction mixture is generally found satisfactory. It is preferred, however, to maintain the maximum catalyst concentration not substantially above about 20%, for example, in the range of from about 5 to about 15% by weight of the reaction mixture. Because of the relatively more rapid reaction rates thereby made possible, it is often desirable to maintain the mol ratio of beta-ether substituted carboxylic charge to catalyst at about unity.

The reaction is executed at a temperature in the range of from about 150 to about 250° C. and preferably in the range of from about 190 to about 225° C. When converting beta-alkoxypropionic acid wherein the alkoxy group is a lower alkoxy group, maintenance of the temperature in the reaction zone at about 200° C. is particularly preferred.

The process is executed at atmospheric or subatmospheric pressures. The use of superatmospheric pressure may be employed within the scope of the invention, however, no significant advantage is derived by the use of pressures substantially higher than those which lie somewhat above atmospheric.

Though generally not essential to the execution of the reaction, solvent capable of dissolving the material being converted and/or the catalyst, and which do not adversely affect the desired reaction, may be employed within the scope of the invention. Solvents may be employed to some advantage when the charge and/or catalyst to the reaction zone is a relatively high boiling liquid or is normally in the solid state.

Under the above conditions the beta-ether substituted monocarboxylic acids are cleaved to reaction products consisting essentially of an alpha,beta-olefinically unsaturated monocarboxylic acid corresponding to the carboxylic acid portion of the charge and a hydrocarbyl alcohol corresponding to the hydrocarbyloxy portion of the charge. Thus, when converting beta-ethoxypropionic acid the reaction products obtained will consist essentially of acrylic acid and ethyl alcohol. The desired unsaturated acid and alcohol are obtained readily with conversions above 90% and with yields above 90%. The remaining reaction products will generally comprise esters of the unsaturated acid and derivatives thereof. An important advantage of the process resides in the absence of any substantial amount of high boiling polymeric or tarry by-products.

A particular advantage of the invention resides in the economy of the process with respect to catalyst utilization. The catalyst remains within the reaction zone for unusually long periods of operation in its active state. The process thus lends itself admirably to continuous operation. In continuous operation the catalyst is introduced into the reaction zone together with the beta-ether substituted monocarboxylic acid charge in the desired proportions. Reaction products comprising alpha,beta-unsaturated acid and alcohol are continuously distilled from the reaction mixture substantially as rapidly as formed. Fresh beta-ether substituted monocarboxylic acid charge is continuously introduced into the system under conditions maintaining the desired ratio of charge to catalyst. The catalyst itself, or the alkali metal or alkaline earth metal precursor thereof, is introduced into the reaction zone only in the amounts necessary to maintain the desired catalyst ratio. Since the catalyst does not leave the reaction zone nor becomes fouled with by-products, the process enables the operation to continue for prolonged periods of time with a relatively small catalyst consumption.

If desired, continuous removal of reaction products from the reaction mixture may be aided by the introduction of a stripping medium such as, for example, a normally gaseous material such as nitrogen, methane or of steam, or the like, into the reaction zone. Such procedure at times may be desirable, particularly when converting a higher boiling beta-ether substituted monocarboxylic acid.

If desired, materials capable of promoting, or otherwise modifying the reaction, may be introduced into the reaction zone. The use of stabilizers in the reaction zone is also comprised within the scope of the invention. Thus stabilizers such as, for example, hydroquinone, and the like, may be introduced in stabilizing amount into the charge to the reaction zone, into the reaction zone proper or into distillation apparatus employed in conjunction with the reaction zone.

Although the invention is not limited to the use of any specific type of apparatus it is preferred to employ as the reaction zone a reaction chamber, or vessel, in communication with a suitable distillation column. The reaction products distilling from the reaction mixture in the reactor proper pass through the distillation column and are fractionated. Overhead from the fractionator column will comprise the desired unsaturated acid and alcohol.

Effluence from the reaction zone is passed to a product recovery zone wherein it is subjected to suitable conventional product recovery means comprising one or more such steps as, for example, distillation, extraction, extractive distillation, adsorption, scrubbing, crystallization, and the like. Any unconverted materials, and if desired byproducts such as, for example, esters of the unsaturated acid product, may be recycled to the reaction zone.

EXAMPLE I

Acrylic acid was produced by deethoxylation of beta-ethoxypropionic acid in a continuous operation (identified herein as run I) using a jacketed reaction chamber equipped with a stirrer, and a distillation column so positioned that vapors leaving the reaction chamber pass directly into the column, and condensate formed in the column returns directly into the reaction chamber. 10 parts by weight of sodium hydroxide and 30 parts by weight of beta-ethoxypropionic acid were introduced into the reaction chamber and brought to a temperature of 200° C. The sodium hydroxide reacted with the beta-ethoxypropionic acid to form sodium beta-ethoxypropionate, the catalyst for the process. Charge, consisting of a mixture containing 77.5% by weight of crude beta-ethoxypropionic acid and 22.5% $H_2O$, was introduced into the reaction chamber as a continuous stream at the rate of 30 parts by weight per hour. The crude beta-ethoxypropionic acid was of a purity of 94%, the balance consisting essentially of heavy ends, and was obtained by the oxidation of beta-ethoxypropionaldehyde with air. The contents of the recation chamber were maintained at 195° C., under a pressure of 500 mm., and were stirred continuously. Reaction products vaporized and passed into the distillation column as rapidly as formed. No additional catalyst was added, nor was liquid bled from the reaction chamber, during the operation which was continued for 115 hours. At the end of this time the catalyst in the reaction chamber was still active. There was obtained a conversion of beta-ethoxypropionic acid of 95% m. with an acrylic acid yield of 91% m. Heavy ends found in the kettle corresponded essentially to the heavy ends component initially in the charge, thereby indicating substantially selective conversion of beta-ethoxypropionic acid. Average overall composition of the reactor effluence taken overhead from the column of the reactor-column system is given the following Table A under the column heading "run I."

In an operation, identified herein as "run II," the continuous de-ethoxylation of beta-ethoxypropionic acid in the presence of a catalyst consisting of the sodium salt of beta-ethoxypropionic acid was repeated under substantially identical conditions used in "run I," but with the exception that the water component was omitted from the feed (the charge, consisting of crude beta-ethoxypropionic acid being introduced into the reaction chamber at the rate of 30 parts by weight per hour) and in that the pressure in the reaction chamber was maintained at 1 atm. Again the catalyst was still active when the operation was stopped at the end of 115 hours. The conversion of beta-ethoxypropionic acid obtained was 98% m. with an acrylic acid yield of 75% m. The average overall composition of the reactor effluence taken overhead from the column of the reactor-column system, is given in the following Table A under the column heading "run II":

*Table A*

|  | Run I | Run II |
|---|---|---|
| $H_2O$ in feed m. percent | 22.5 | 0 |
| Conversion | 91 | 98 |
| Percent composition column overhead, w. percent: | | |
| Acrylic acid | 35.1 | 33.8 |
| Ethanol | 22.4 | 22.6 |
| Ethoxy-ethylpropionate | 5.8 | 15.5 |
| Beta-ethoxypropionic acid | 4.1 | 4.1 |
| Ethyl acrylate | 0.8 | 5.4 |
| Ethyl formate | 0.13 | 0.25 |
| $H_2O$ | balance | balance |

In a continuous operation, identified herein as "run III" acrylic acid was produced by liquid phase cleavage of beta-methoxypropionic acid in the presence of a catalyst consisting of the sodium salt of beta-methoxypropionic acid. The reaction chamber-distillation column system employed was the same as that used in the operations runs I and II of foregoing Example I. 10 parts by weight of NaOH and 40 parts by weight of beta-methoxypropionic acid were charged to the reaction chamber and brought to 190° C. thereby forming the sodium beta-methoxypropionic catalyst in the reaction chamber. The reactor contents were maintained at a temperature of 119° C., a pressure of 500 mm. absolute, and were stirred throughout the operation. Charge consisting of a mixture containing 80% by weight crude beta-methoxypropionic acid and 20% water was introduced into the reaction chamber as a continuous stream, at the rate of 30 parts by weight per hour, for a period of 83 hours. When the run was stopped the catalyst was still clean and active. No liquid bleed was taken from the reactor and no catalyst was added after the run was initiated. Reaction products vaporized as rapidly as formed and passed from reaction chamber into the column. A conversion of beta-methoxypropionic acid of 96% with a yield of acrylic acid of 83% was obtained. The average overall overhead from the column receiving the vaporized reactor effluence had the following composition:

| | Mol percent |
|---|---|
| Acrylic acid | 43.2 |
| Methanol | 15.0 |
| Beta-methoxy methylpropionate | 10.3 |
| Methyl acrylate | 4.7 |
| Beta-methoxypropionic acid | 4.3 |
| Trace materials | 0.1 |
| Water | Balance |

Similarly other beta-hydrocarbyloxy aliphatic monocarboxylic acids are cleaved to reaction products comprising alpha,beta-olefinically unsaturated aliphatic monocarboxylic acids and alcohols.

We claim as our invention:

1. The process for the production of acrylic acid which comprises heating a beta-alkoxypropionic acid wherein the beta-alkoxy group contains from one to seventeen carbon atoms, in the liquid phase at a temperature of from about 150 to about 250° C. in the presence of from about 0.1% to about 25% by weight, based upon the total reaction mixture, of a catalyst consisting essentially of an alkali metal salt of a beta-alkoxypropionic acid.

2. The process in accordance with claim 1 wherein said catalyst consists essentially of a sodium salt of a beta-alkoxypropionic acid.

3. The process for the production of acrylic acid which comprises heating beta-ethoxypropionic acid in liquid phase at a temperature of 190 to 225° C. in the presence of from about 0.1% to about 25% by weight, based upon the total reaction mixture, of an alkali metal salt of beta-ethoxypropionic acid.

4. The process in accordance with claim 3 wherein said catalyst consists essentially of sodium beta-ethoxypropionate.

5. The continuous process for the production of acrylic acid which comprises introducing beta-alkoxypropionic acid having from one to seventeen carbon atoms in the alkoxy group as a continuous stream into a reaction zone containing a reaction medium consisting essentially of said beta-alkoxypropionic acid and from about 0.1% to about 25% by weight, based upon the total reaction mixture, of an alkali metal salt of said beta-alkoxypropionic acid, maintaining said reaction medium in liquid phase at a temperature of from about 150 to about 250° C., thereby cleaving said beta-alkoxypropionic acid with the formation of reaction products consisting predominantly of acrylic acid and an alkanol, and removing said reaction products from said reaction zone substantially as rapidly as formed therein.

6. The process in accordance with claim 5 wherein said beta-alkoxypropionic acid is beta-ethoxypropionic acid and said alkanol is ethanol.

7. The continuous process for the production of acrylic acid which comprises introducing beta-ethoxypropionic acid as a continuous stream into a reaction zone containing a reaction medium consisting essentially of said beta-ethoxypropionic acid and from about 0.1% to about 25% by weight, based upon the total reaction mixture, of the sodium salt of said beta-ethoxypropionic acid, maintaining said reaction medium in liquid phase at a temperature of from about 150 to about 250° C., thereby cleaving said beta-ethoxypropionic acid with the formation of reaction products consisting predominantly of acrylic acid and ethanol, and removing said reaction products from said reaction zone substantially as rapidly as formed therein.

References Cited in the file of this patent

UNITED STATES PATENTS 2,341,663   Schluz _____ Feb. 15, 1944